United States Patent Office 2,768,150
Patented Oct. 23, 1956

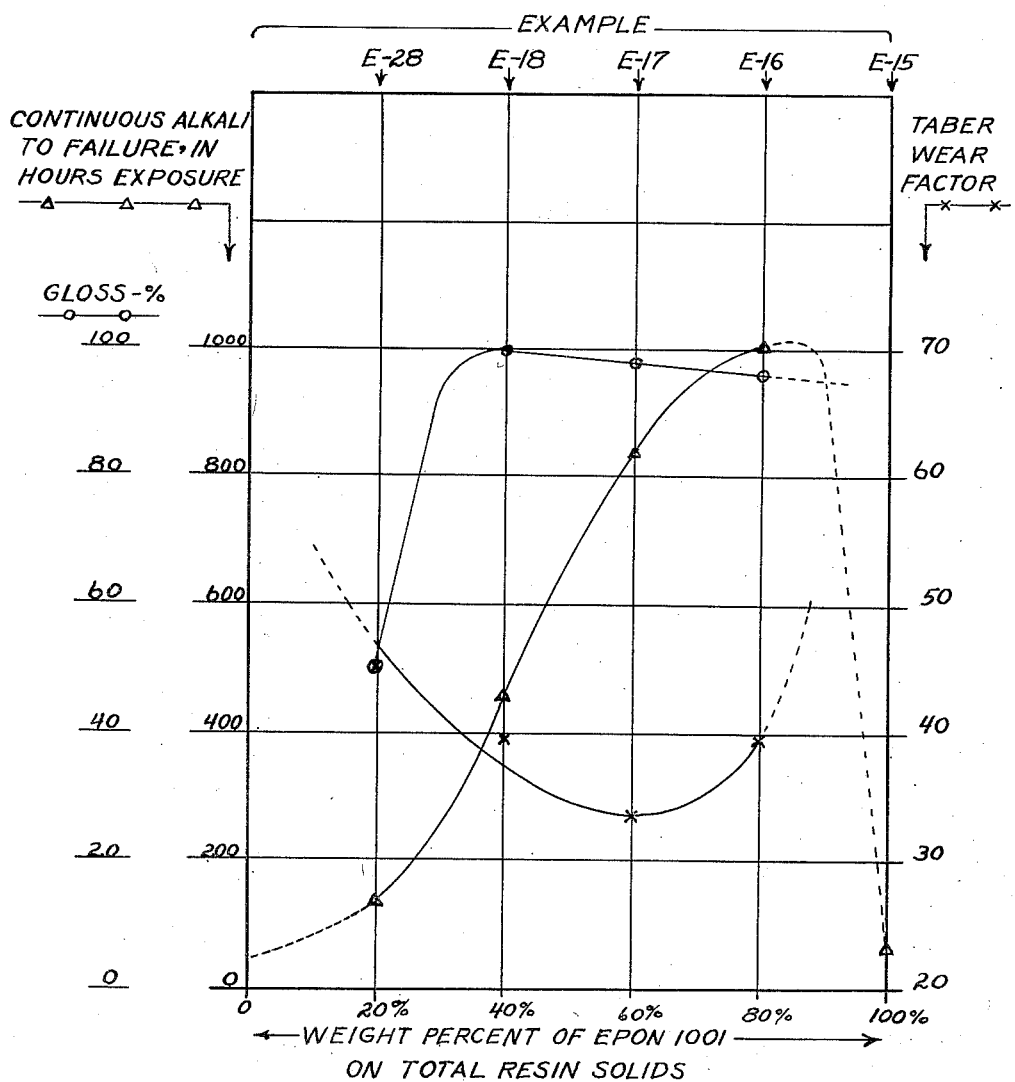

2,768,150

SILANE DERIVATIVE-EPOXIDE RESIN COMPOSITION AND COATINGS THEREOF

Ronald L. Millar, Chicago, Charles G. Moore, Oak Park, and Norman G. Peterson, Chicago, Ill., assignors to The Glidden Company, Cleveland, Ohio, a corporation of Ohio Application March 4, 1952, Serial No. 274,826

18 Claims. (Cl. 260—42)

This invention relates to new compositions resulting from the reaction of silane derivatives with complex epoxides in regulated proportions, said compositions being capable of curing by heat to give useful, durable resins and coating compositions. The complex epoxides used in making the new compositions are themselves derived from the reaction of dihydric phenols with epichlorhydrins and like chlorhydrins in regulated proportions. The invention includes intermediate reaction compositions as well as the final reaction compositions, coatings and products made therefrom, and includes methods for preparing the novel compositions.

One of the objects of the invention is to prepare and provide heat-convertible coating compositions capable of being baked to form desirable protective coatings on metals and other materials capable of withstanding the baking temperatures.

Another object is to prepare and provide adhesives, plasticizers, films, impregnants, laminants, molded products and other finished products characterized by outstanding physical properties.

An additional object is to provide reaction products of silane derivatives with complex epoxides which are modified or not with resinous alkyd products resulting from the reaction of substantially equivalent quantities of polyalcohol with dibasic acids and/or their anhydrides.

Other and related objects will be apparent from the following description and examples of the invention taken in conjunction with the attached single figure of drawings in which various properties of vehicles prepared in conformity with the principles of the invention are plotted against the proportions of siloxy moiety and epoxy moiety employed in preparing the various vehicles.

We have discovered that very durable, hard, elastic and adhesive protective coatings, pigmented or clear, can be formed in accordance with the principles of our invention from a blended or heat-bodied mixture of, for example, a siloxy-glyceryl phthalate reaction product and a dihydric phenol-epichlorhydrin resinous epoxy-containing reaction product. Such a mixture is prepared as a solution in suitable organic solvents, and after it has been applied in any conventional manner to the surface which is to be coated, the applied coating is baked to effect final reaction and curing. It should be understood that there are two main resinous moieties employed in the coating compositions of the invention; namely, a siloxy moiety and a complex epoxide moiety, and they may exist in the composition either in simple admixture or in a partially condensed (heat-bodied) state. The preparation of each of these moieties will be described hereinafter under corresponding topic headings. The preparation of the coating composition from these moieties will then be discussed under the heading "The Blended or Heat-Bodied Mixture." The baking operation will be discussed under the heading "Curing."

We have also discovered that the two resinous moieties described above, when prepared as solid materials, can be mixed as finely-divided powders to provide molding powders. When the moieties are blended together in an appropriate quantity of common solvent, adhesives, impregnating solutions and laminating solutions may be prepared. The following description of the various aspects of the invention should be understood to apply to such products as well as to coating compositions, except where otherwise expressly indicated.

THE SILOXY MOIETY

The siloxy moiety is conveniently prepared from two classes of raw material, the first being a siloxy polyalcoholide (e. g., a siloxy-glyceride) and the second being an acidic material of the dicarboxylic acid class.

THE SILOXY POLYALCOHOLIDE ("A" COMPONENT)

This is a condensate (hereinafter designated as the "A" component) of certain silanes or siloxanes with certain alcohols, prepared under such conditions and with such proportions of reactants as to yield condensation products having the following general formula:

$$\left[ R_a(R'O)_b \mathrm{Sio}_{\frac{4-(a+b)}{2}} \right]_x \left[ R''O_{\frac{v}{2}}(OH)_w \right]_y$$

wherein R represents a phenyl radical or any alkyl radical having one to six carbons, inclusive, and wherein R preferably consists of phenyl radicals or mixtures of phenyl and methyl radicals; wherein R' represents any primary or secondary hydrocarbon radical having from one to twenty carbons, inclusive, but preferably having one to six carbons, inclusive; wherein R'' represents a polyvalent hydrocarbon radical; wherein $a$, $b$, $v$ and $w$ have the following average values:

$a = 1$ to 2   $v = 1$ to 3
$b = 0$ to 0.5   $w$ is a number up to 3 wherein the sum of $v$ plus $w$, exclusive of oxygens or hydroxyls attached to tertiary carbon atoms and aromatic nuclei, is from 2 to 5, inclusive, and the values of $a$, $b$ and $w$ are related by the expression $K = [4-(a+)]w$ so as to give K a value between 1 and 4, inclusive, but preferably a value above 2 up to 4; and wherein the ratio of $x$ to $y$ is from 1 to 2 up to 4 to 1.

The following formulae illustrate a few of the types of polyalcoholides contemplated for use in the invention:

1. 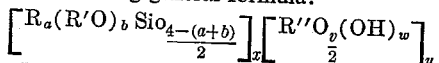

$a=2$   $v=1$   $x/y=1/2$; $K=4$
   $b=0$   $w=2$

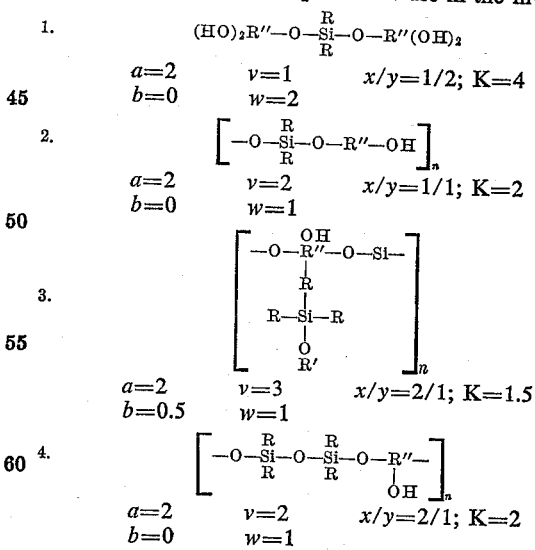

The siloxy polyalcoholides can be prepared by a variety of known methods. Suitable methods are disclosed in the United States patent application of Hunter and Rauner, Serial Number 59,414, filed November 10, 1948. Where the "A" component is prepared by reacting polyhydric alcohols with substituted silanes, suitable polyhydric alcohols are those having from 2 to 5 hydroxyls, examples of which are glycol, glycerine, pentaerythritol, trimethylol propane, trimethylolethane and TMC (2,2,6,6-tetramethylolcyclohexanol). Substituted silanes suitable for reaction with such alcohols are methylphenyldiethoxysilane, diphenyldiethoxysilane, dimethyldiethoxysilane, diethyldiethoxysilane and corresponding chloro-, acetoxy-, isopropoxy-, methoxy-, bromo-, etc. silanes. Moderate amounts of mono alkyl or aryl silanes of the types just mentioned may be used. It should be understood that the R— groups of any particular substituted silane employed in the invention may be the same or different, and that they may be the same as or different from the R'— groups of the R'O— radicals. The R'O— radicals should preferably, as indicated above, be derived from or correspond to primary and secondary alcohols since on alcoholysis the primary and secondary alcohols can be removed readily in good yield while tertiary alcohols are difficult to remove.

While we have indicated above that the R substituents should be composed of 1 through 6 carbons, it is also possible to use higher alkyl, aryl or aralkyl radicals, e. g. $C_{14}$ alkyl radicals either alone or in combination with the lower radicals, to effect modifications in solvent tolerance, in film properties, etc.

The acidic components which are reacted with the siloxy polyalcoholides to form the siloxy moiety are dicarboxylic materials selected from the group consisting of dicarboxylic acids, their anhydrides, and mixtures thereof, examples of which are phthalic, maleic, tetrahydrophthalic, herahydrophthalic, carbic (bicyclo[2,2,1]-5-heptene-2,3-dicarboxylic), polyadipic, succinic, itaconic and citraconic acids and their anhydrides, and many others. We especially prefer to use phthalic and maleic anhydrides, or mixtures thereof.

For the sake of brevity and convenience in designating the various modifications of the invention which are contemplated here, we will hereafter refer to the reaction products of "A" components with the dibasic acidic materials as "B" components, and we will refer to such "B" components as are modified further with alkyd resin and/or monobasic acid(s) as "C" components. Coating vehicles and like products which are prepared by co-condensing an epoxy component with either a "B" or "C" component will be referred to as "D" products, and formulated coating compositions will be identified as "E" products.

THE "B" COMPONENT(S)

In preparing the siloxy moiety for use in the invention, we prefer to first prepare or otherwise provide an "A" component characterized by a chemical structure illustrated in the foregoing general formula. After a suitable "A" component has been provided within the scope of that general formula, it is next reacted with one or more acidic materials to form a reaction product here identified as a "B" component. For instance, phthalic anhydride may be reacted with a siloxy-glyceride to form a siloxy-glyceryl phthalate, or at least to make a single product constituting the siloxy moiety ("A" component) of an embodiment of the invention and containing the "A" component along with enough acidic component (either completely reacted therewith or only partially reacted with the "A" component) to introduce a desired amount of potential carboxyls for curing the epoxy moiety of the embodiment. It should be noted that this concept involves a distinct departure from the principles expressed in the Castan Patent No. 2,324,483 in that the potential carboxyls are here contained in a siloxy intermediate. This departure yields a controllable process and a relatively more stable product. It will be understood that the amount of acidic component put into the siloxy moiety is variable within rather broad limits dependent on the extent to which one desires to cure the epoxy moiety, thereby to obtain variations in resulting resin properties. As is shown in Example D-0 below, a film can be prepared without the presence of dibasic acid, but we prefer to use at least a small amount of such acid and especially prefer amounts which when heated for a prolonged period of time in the presence of the "A" component will produce a "B" component which is capable of gelling. It should be clearly understood, however, that in actual practice the "A" component and acidic material are not heated or reacted together long enough to actually cause gelation, and that the ability of the resulting "B" component to gel on prolonged heating is merely a test for determining the especially preferred amounts of acidic material. As to the maximum amount of acidic material which can be used in preparing coating vehicles and other end products, that is determined by increasing the quantity until further additions cause development of a two-phase system which will not become a homogeneous single-phase system when either blended or co-condensed with the epoxy moiety in volatile organic solvents at solids contents appropriate for the intended use, e. g. coating compositions. Thus the maximum quantity of acidic material in a coating composition is a practical one, in that so much should not be used as will prevent the finished coating vehicle from being a homogeneous, single-phase liquid. Neither the maximum nor the especially preferred minimum concentration of acidic material can be expressed numerically on any basis yet discovered, since the amounts vary with so many different factors. Thus the amount varies with the particular composition and extent of reaction involved in the "A" component; with the extent of reaction of the "A" component with the acidic material; with the constitution, molecular weight, epoxy equivalent, hydroxyl equivalent and amount of the epoxy moiety employed; and with the desired variations in flexibility, hardness, adhesion, alkali-resistance, and other properties of the baked and cured final film. Moreover, careful consideration of the chemical reactions which occur either at the various stages in the preparation of the coating composition or in the final curing of the film has so far failed to provide any practical basis for estimating the quantity of acidic material which can be employed as the maximum or as the especially-preferred minimum. We have discovered in our extensive investigations, however, that the said preferred lower limit is set by the fact that the "B" component must be capable of gelling on prolonged heating, and that the upper limit, so far as coatings are concerned, is based on the practical requirement of having a final film-forming vehicle which is homogeneous. When laminants, impregnants, adhesives, or molding powders are to be prepared instead of coating compositions, then the homogeneity requirement becomes less important, and it is then possible to exceed the upper limits useful for coating compositions. For most purposes, however, the coating limits are equally satisfactory for laminants, impregnants, adhesives, molding powders, etc.

We have discovered that even when the quantity of acidic material is within the limits expressed above, some variations in compatibility occur depending on whether the dibasic acids or their anhydrides are reacted in the first place with the "A" component. Since more water is liberated when acids rather than anhydrides are reacted, and since the presence of water may cause detrimental hydrolysis of the "A" component, we prefer to use the anhydrides, or at least to react anhydrides with the "A" component initially, and subsequently to use the acids to make up the desired total quantity of the acidic material. We do not intend to suggest that the acids may not be reacted first with the "A" components, since in our investigations we have found numerous instances where acids may be employed initially in relatively large proportions, after which the remainder of the acidic material can be added in the form of anhydrides. For the sake of avoiding unnecessary complications, however, we prefer either to use anhydrides entirely, or where there is a cost advantage in using part acid and part anhydride, to first introduce the anhydride and follow it with the acid. One skilled in the art can readily determine to what extent or advantage he can use the acids instead of the anhydrides.

THE "C" COMPONENT(S)

The "B" component may be modified extensively by adding a preformed, or by forming in-situ and thereby introducing, unmodified alkyd resin. Such modifications of the "B" component result in what is hereafter identified as a "C" component. Thus, excess polyalcohol and an equivalent excess of acidic material can be introduced when reacting the "A" component with acidic material to form a "B" component, the excess ingredients forming alkyd resin. Alternatively, the "A" component can be formed initially by incorporating an excess of the polyalcohol therein, and then when the resulting "A" component is being reacted with acidic material, a sufficient excess of acidic material can be introduced to form the desired alkyd as well as the desired "B" product. The amount of alkyd provided in the resulting "C" components can vary widely, as for instance, one equivalent of the product ("A" component) of Example A1 below, having a calculated hydroxyl equivalent of 152, can be reacted with 5 equivalents of phthalic anhydride and 3 equivalents of glycerine to form a final resinous product which is very useful as a film-forming material by itself or as a siloxy moiety for combination with an epoxy moiety. A somewhat less desirable film-forming material and siloxy moiety is obtained by reacting one equivalent (152 g.) of the same "A" component with 15 equivalents of phthalic anhydride and 13 equivalents of glycerine.

The "B" component can also be modified with monobasic acids such as fatty acids to obtain desired alternations or modifications in film properties, as for instance to improve flowing qualities, to overcome cratering tendencies when present, to secure wider solvent tolerance, or to improve slickness and other properties of the cured film. Besides introducing the monobasic acids directly into the mass when preparing the "B" components, it is possible to use monoglycerides for instance when preparing the "A" component, thereby introducing the desired monobasic acid radical(s). As noted above, such monobasic acid modifications of "B" components are also included in the designation: "C" component.

The following examples illustrate the preparation, proportioning and modification of the siloxy moiety of the invention.

Example A-1

A siloxy-glyceride was prepared from the following ingredients:

Phenylmethyldiethoxysilane _____ 378 g. (1.8 mols).
Phenyltriethoxysilane _____ 48 g. (0.2 mol).
USP glycerine (95% glycerine) _____ 193 g. (2.0 mols).
Concentrated HCl _____ 1-2 g.

These materials were mixed and heated to reflux in a three necked flask equipped with agitater, thermometer and condenser. After holding at reflux for ½ hour, distillation of ethanol was started. When the batch temperature reached 200° C. (requiring about 3 hours), the theoretical amount of ethanol had been recovered and the product was cooled. The finished reaction product had a calculated hydroxyl equivalent weight[1] of 152 g. and had the following values for the alphabetical subscripts of the above general formula Calculated:
 $a=1.9$
 $b=0$
 $v=1.6$
 $w=1.4$
 $x/y=1$
 $K=2.94$

[1] Equivalent weight=$N/D$, where N equals weight charged minus weight of ethanol evolved, and where D equals equivalents of glycerine plus equivalents of water minus equivalents of ethanol evolved.

Example A-2

One mole of diphenyldichlorosilane was mixed with one mole of synthetic glycerine (a product of The Shell Chemical Co.) and the mixture was heated to 160° C. until all of the hydrogen chloride by-product had been removed.

Example A-3

Two thousand grams of a partially hydrolyzed mixture composed of 0.7 mole phenylmethyldiisopropoxysilane and 0.3 mole phenyltriisopropoxysilane, said mixture containing 44% isopropoxy (15 equivalents of isopropoxy), was mixed with 685 grams USP glycerin (22.4 equivalents of hydroxyl, neglecting water) and the mixture was cooked to 200° C. until volatiles equivalent to 100% theoretical isopropanol had been obtained.

Example A-4

Nine moles of phenylmethyldichlorosilane and one mole of phenyltrichlorosilane were mixed together with 10.5 moles of USP glycerin and the whole mass heated to 200° C. for two hours to remove the last traces of hydrogen chloride.

Example A-5

920 grams of synthetic anhydrous glycerine (a product of The Shell Chemical Company) was mixed with 2380 grams of phenylmethyldiisopropoxysilane and the mixture was heated until isopropanol had been removed to 97% of theory.

Example A-6

1772 grams (12 equivalents of isopropoxy) of partially hydrolyzed phenylmethyldiisopropoxysilane containing 40% isopropoxy was mixed with 544 grams of pentaerythritol (16 equivalents of hydroxyl) and the mixture was heated to 200° C. with removal of 701 grams of isopropanol (97.5% of theory).

Example A-7

13.4 moles diethyldichlorosilane was mixed with 12.0 moles USP glycerin and with 200 grams of benzene, and the whole mass was heated at 200° F. until all of the benzene and hydrogen chloride had been removed.

Example A-8

Two moles (258 g.) of dimethyldichlorosilane and 2 moles (184 g.) USP glycerin were mixed together and heated at 200° C. while carbon dioxide was passed through the mass until all of the hydrogen chloride had been removed.

Example A-9

735 grams of phenylmethyldiethoxysilane (7.0 equivalents of ethoxy), 360 grams of phenyltriethoxysilane (4.5 equivalents of ethoxy) and 530 grams of USP glycerine (17.25 equivalents of hydroxyl) were mixed together and heated at 200° C. until ethanol had been removed in an amount equivalent to 90% of theory.

Example A-10

456 grams of trimethylene glycol and 840 grams of phenylmethyldiethoxysilane were mixed together and heated at 200° C. until 361 grams (98.3% theory) of ethanol had been removed.

In reacting the siloxy-polyalcoholides with the dibasic acids and/or their anhydrides, various solvents may be used, such as ethers, aromatic hydrocarbons, aliphatic or aromatic ketones, and esters. Similar solvents may also be used to thin the resulting resinous reaction product ("B" component). Ester-type solvents should preferably be kept to a minimum or excluded altogether since we have found that they tend to enter into chemical reaction during the formation of the "B" component so as to consume carboxyl groups. Small quantities of the products resulting from such chemical reaction can be tolerated, but preferably are excluded by avoiding the use of the ester-type solvents during this reaction. Solvents of the classes mentioned above may be used alone or in any mixtures thereof provided, of course, that they are mutually compatible and maintain the "B" and/or "C" components and their resulting solutions in a homogeneous, single-phase condition.

*Example B–3*

304 g. of the product of Example A–1 were next heated with 60 g. xylol under an atmosphere of carbon dioxide gas to about 95° C. at which time 296 g. (2 mols) of dry phthalic anhydride were added. Heating was continued for a further 4.5 hours at temperatures between 142° C. and 166° C., and during that time a total of about 5 g. of water was liberated and expelled. At the end of the 4.5 hour heating period, the resulting reaction product was thinned with 400 g. of cyclohexanone to give a solution having a viscosity of X—Y (Gardner-Holdt), a color of 2 (Hellige), an acid value of 78.3 and an N. V. M. of 64.8%.

*Example B–3A*

Instead of using all phthalic anhydride as in Example B–3, we have also prepared an equivalent reaction product by heating 304 g. of the siloxy-glyceride (Example A–1) with 164 g. phthalic acid and 46 g. xylene at temperatures of 148–196° C. for 5⅓ hours. During this time a total of 20 cc. of water was removed. Then 148 g. of phthalic anhydride was added and the heating was continued at temperatures between 163 and 192° C. for 2⅔ hours. An additional 6 cc. of water was removed thereby. The mass was then thinned with 354 g. of cyclohexanone. Gardner-Holdt viscosity was Y—Z.

*Example B–3B*

Likewise an equivalent product was prepared by adding 148 g. phthalic anhydride to 304 g. of the siloxy-glyceride (Example A–1) along with 45 g. xylene, and heating for 9 hours at temperatures of 162–169° C. During this stage only a trace of water was removed. Then 164 g. of phthalic acid was added and heated for 5⅓ hours at temperatures of 145–176° C., a total of 25.2 cc. water being removed. This mass was then thinned with 355 g. cyclohexanone. Gardner-Holdt viscosity was Y—Z.

*Example B–3C*

Still another equivalent product was prepared by heating 304 g. of the siloxy-glyceride (Example A–1), 328 g. phthalic acid and 62 g. xylene together for a period of 5⅙ hours at temperatures of 141–178° C. A total of 48.6 cc. water was removed. The resulting product was then thinned with 360 g. cyclohexanone. Gardner-Holdt viscosity was X.

In the following tables, the solvents are identified by the following symbols:

S1  xylol
S2  methyl isobutyl ketone
S3  cyclohexanone
S4  isophorone
S5  methyl ethyl ketone
S6  butyl acetate
S7  acetate of ethylene glycol monoethyl ether

TABLE I

| | Examples | | | | | | | | | |
|---|---|---|---|---|---|---|---|---|---|---|
| | B-1 | B-2 | B-3 | B-4 | B-5 | B-6 | B-7 | B-8 | B-9 | B-10 |
| S. P. A.[a], type | A-1 | A-1 | A-1 | A-1 | A-1 | A-1 | A-1 | A-1 | A-1 | A-2 |
| S. P. A.[a], weight | 152 | 152 | 152 | 152 | 152 | 152 | 152 | 152 | 152 | 403 |
| Anhydride | Pht | Pht | Pht | Mal | Pad | Car | Pht | Pht | Pht | Pht |
| Anhydride, grams | 74 | 111 | 148 | 98 | 112 | 164 | 148 | 148 | 148 | 197 |
| Solvent | S1 | S1 | S1 | [e]S1,3 | S1 | S1 | S1 | S1 | S1 | S1 |
| Solvent, grams | 22.5 | 26 | 30 | 50 | 53 | 63 | 30 | 30 | 30 | 67 |
| Reflux (hours) | 14.7 | 6 | 6.5 | 2 | 3 | 12.3 | .25 | 4.25 | 7.25 | 9 |
| Reducer | S3 | S3 | S3 | S3 | none | S3 | S2 | none | S2 | S3 |
| N. V. M. (percent) | 60.1 | 62 | 64.8 | 58.4 | | 55.9 | 50.2 | | 62 | 66.5 |
| Acid Value[b] | 18.3 | 48.7 | 78.3 | 70 | | 98 | 181 | 108 | 83.8 | 28.6 |
| Viscosity[c] | T-U | X | X-Y | U-V | | V | A | | R | Z-Z₁ |
| Color[d] | 1-2 | 1-2 | 2 | 3 | | 3 | 1 | | 1 | 5-6 |
| Used to make | E-1 | E-2 | E-3 | E-4 | D-1 | E-6 | D-2 | D-2, D-8, D-9, D-10 | D-4 | E-22 |

| | Examples | | | | | | | | |
|---|---|---|---|---|---|---|---|---|---|
| | B-11 | B-12 | B-13 | B-14 | B-15 | B-16 | B-17 | B-18 | B-19 |
| S. P. A.[a], type | A-2 | A-3 | A-4 | A-5 | A-6 | A-7 | A-8 | A-9 | A-1 |
| S. P. A.[a], weight | 403 | 152 | 152 | 166 | 200 | 200 | 199 | 213 | 237 |
| Anhydride | Pht | Pht | Pht | Pht | Pht | Pht | Pht | Pht | Pht |
| Anhydride, grams | 197 | 148 | 148 | 111 | 148 | 118 | 198 | 148 | 363 |
| Solvent | S1 | S1 | S1 | S1 | S1 | S1 | S1 | S1 | S1 |
| Solvent, grams | 67 | 60 | 60 | 57 | 39 | 35 | 44 | 40 | 67 |
| Reflux (hours) | 9 | 4 | 4 | 3.75 | 5.5 | 2.5 | 4.1 | 4.5 | 4 |
| Reducer | S2 | none | none | none | S3 | S3 | S3 | S3 | none |
| N. V. M. (percent) | 60 | | | | 54.1 | 60 | 60 | 64.9 | |
| Acid Value[b] | | | | | 146 | 64 | | 38.5 | |
| Viscosity[c] | | | | | Q-R | [f]2p | [f]2p | Z₁ | |
| Color[d] | | | | | 4 | | | 1-2 | |
| Used to make | D-11 | D-12 | D-13 | D-14 | E-27 | | | | D-15 |

Notes:
[a] Abbreviation for siloxypolyalcoholide.
[b] Represents acid value on non-volatile material.
[c] Gardner-Holdt.
[d] Hellige.
[e] Mixtures of equal parts xylol and cyclohexanone.
[f] Two-phase.

Key for dibasic anhydride symbols: Car—carbic; Mal—maleic; Pad—polyadipic; Pht—phthalic.

TABLE II

| | Example | | | | |
|---|---|---|---|---|---|
| | C-1 | C-2 | C-3 | C-4 | C-5 |
| SPA,[1] type | A-1 | A-1 | A-1 | A-1 | A-1 |
| SPA,[1] weight | 152 | 152 | 152 | 152 | 152 |
| Anhydride | Pht | Pht | Pht | Pht | Pht |
| Anhydride, grams for SPA[1] | 148 | 148 | 133 | 133 | 133 |
| Anhydride, grams for alkyd | 37 | 965 | none | none | none |
| Glycerine (100%) grams | 15 | 392 | none | none | none |
| Monobasic acid | none | none | [5] 2eh | [6] tbb | lauric |
| Monobasic acid, grams | | | 23.8 | 35.6 | 40 |
| Solvent | S1 | S1 | S1 | S1 | S1 |
| Solvent, grams | 35 | 164 | 32 | 32 | 32 |
| Reflux (hours) | 3 | | 8.5 | 8.5 | 9.5 |
| Reducer | S3 | S3 | S2 | S2 | S2 |
| N. V. M. (percent) | 64.2 | 69.0 | 55.7 | 60.3 | 58.5 |
| Acid Value[2] | 77.0 | 86.2 | 52.5 | 54.7 | 38.6 |
| Viscosity[3] | Z2 | Z5 | Q | Q | O-P |
| Color[4] | 2 | 2 | 2-3 | 2-3 | 2-3 |
| Used to make | E-10 | E-11 | D-5 | D-6 | D-7 |

Notes:
[1] Abbreviation for siloxypolyalcoholide.
[2] Represents acid value on non-volatile material.
[3] Gardner-Holdt.
[4] Hellige.
[5] 2-ethyl hexoic.
[6] Tertiarybutylbenzoic.

Key for dibasic anhydrides: Pht—phthalic.

While we have hereinabove described and exemplified the preparation of "B" and "C" components by two-step processes in which the siloxypolyalcoholide is separately prepared and then reacted with acidic material, it should be understood that a "B" or "C" component can be prepared directly in a single step, as, for example, by reacting the desired proportions of phenylmethyldichlorosilane, glycerine and phthalic anhydride.

THE EPOXY MOIETY

The epoxy moiety is a complex resinous material preferably composed of polyether derivatives of dihydric phenols with polyfunctional halohydrins, said derivatives containing epoxy groups and being free of functional groups other than epoxy and hydroxyl groups. The dihydric phenols and polyfunctional halohydrins are reacted in manners and proportions well understood in the art (for example, Greenlee Patent No. 2,521,911, of September 12, 1950) so as to form a complex epoxide resin of the type described in said patent, namely: complex resinous epoxides which are polyether derivatives of polyhydric phenols having alternating aromatic and aliphatic nuclei united through ether oxygen, having terminal epoxy groups and being free from functional groups other than epoxy and hydroxyl groups. Epichlorhydrin and glycerol dichlorhydrin are examples of polyfunctional halohydrins, while resorcinol and "bisphenol" are examples of dihydric phenols useful in forming such epoxide resins. "Bis-phenols" may be prepared by methods such as are described in U. S. Patent No. 2,182,308 using phenol and various ketones having up to 6 carbons in each chain attached to the keto group.

The complex epoxide resins contemplated for use in our invention may have a wide range of functionality due to the relative proportions of epoxy and hydroxyl groups in the molecule. As is shown in subsequent examples, excellent coating compositions may be prepared in accordance with the invention by employing "bis-phenol"-epichlorhydrin resins having an epoxide equivalent of from 170 to 3000, corresponding to an hydroxyl equivalent of 85 to 200. It is known that the epoxy equivalent weight or the epoxy-plushydroxyl equivalent weight of any complex epoxide resin such as described above may be related somewhat to the "n" value of the formula which theoretically expresses the general chemical nature of the resins resulting from condensation of a polyhydric phenol with epichlorhydrin. Such a formula is:

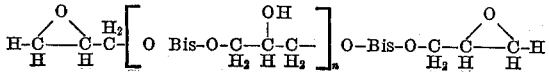

where "Bis" represents a dihydric phenolic residue such as the "bisphenol" residue:

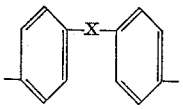

wherein X is the hydrocarbon residue of any cyclic ketone of up to 6 carbons, inclusive, or is the group

in which R represents any alkyl, aryl or alicyclic group having through 6 carbons and R' represents any alkyl group of up to 6 carbons, inclusive. The "n" value of the epichlorhydrin-"bisphenol" condensate may vary from about 0 to about 7 in resins which we have found to be satisfactory for use in preparing our compositions, but we prefer "n" values between 0 and about 3. Various complex epoxy resins of the types described above are currently available as commercial products under the trade-name of "Epon Resins" (Shell Chemicals Company), and are supplied with information concerning their epoxy and epoxy-plus-hydroxyl equivalents. The "Epon" resins referred to hereinafter in the examples are the reaction products of epichlorhydrin and 4-4'-dihydroxy-diphenyl-2,2-propane.

THE BLENDED OR HEAT-BODIED MIXTURE OF COMPONENTS

In the preparation of coating compositions from the siloxy moiety ("B" or "C" components) and the epoxy moiety, it is convenient to dissolve both moieties in a common organic solvent or in a mixture of organic solvents. We have previously indicated the various types of organic solvents which may be used to dissolve the siloxy moiety. Combinations of these types of solvents may be used also in dissolving the epoxy moiety. It will be apparent to one skilled in the art that the solids content can be adapted to the intended type of application (e. g. brushing, spraying, etc.). The proportions of the siloxy and epoxy moieties in the mixture may range from one extreme of a small effective amount of the epoxy moiety in combination with siloxy moiety as the remainder (exclusive of solvents) to the other extreme in which 1 part of the siloxy moiety is mixed or combined with about 9 parts of the apoxy moiety. The figure of drawings illustrates the variations in several of the properties of coating vehicles which have been prepared from proportions of siloxy moiety and epoxy moiety within the range just stated. In preparing the solution, we prefer to dissolve the moieties or to mix their respective solutions without the use of heat. However, some heat may be employed if desired to expedite the operation. The moieties are apt to react, however, when so heated, in about the same manner that they react during the baking operation, so it is inadvisable to allow the solution to stay at elevated temperatures for any protracted period of time unless one desires to effect some heat-bodying of the mixture prior to application.

Due to the acidic reaction of the "B" and "C" components, the blended or heat-bodied coating should not be pigmented with pigments which are adversely affected by acidic conditions. Strongly basic pigments should be avoided, or used only in small, controlled amounts giving the desired extent of reaction. Otherwise, any of the customary and conventional pigments and fillers or extenders may be employed in the coating compositions of our invention.

The following examples illustrate the preparation of varnish and enamel compositions from various siloxy moieties and from various epoxy moieties:

*Example D-0*

152 g. of the product of Example A-1 was reacted with 170 g. of an "Epon" resin (RN 34) in the presence of 32 g. xylene under reflux at a maximum temperature of 159° C. for a period of 5 hours. At the end of this time the product was thinned with 200 g. cyclohexanone. A film of the resulting composition was applied to clean, plain steel and baked one-half hour at 425° F. The baked film withstood boiling water for 1½ hours without losing its integrity.

TABLE III

| | Examples | | | | | | | | | | | | | | |
|---|---|---|---|---|---|---|---|---|---|---|---|---|---|---|---|
| | D-1 | D-2 | D-3 | D-4 | D-5 | D-6 | D-7 | D-8 | D-9 | D-10 | D-11 | D-12 | D-13 | D-14 | D-15 |
| Intermediate | B-5 | a B-7 | B-3 | B-9 | C-3 | C-4 | C-5 | B-8 | B-8 | B-8 | B-11 | B-12 | B-13 | B-14 | B-19 |
| Intermediate, grams | 317 | 332 | 210 | 330 | 449 | 414 | 427 | 330 | 330 | 330 | 445 | 360 | 360 | 341 | 330 |
| "Epon" resin | 1001 | 1001 | 1001 | 1001 | 1001 | 1001 | 1001 | f RN34 | g 1001 | h 1004 | 1001 | 1001 | 1001 | 1001 | 1001 |
| "Epon" resin, grams b | 264 | 300 | 271 | 300 | 250 | 250 | 250 | 300 | 300 | 300 | 297 | 340 | 300 | 284 | 297 |
| Solvent | none | S1 | d S1,2 | S1 | none | none | none | S1 | S1 | S1 | none | none | none | none | S2 |
| Solvent, grams | | 30 | 120 | 39 | | | | 30 | 30 | 30 | | | | | 115 |
| Reducer | c S1,3,4 | S2 | S2 | S2 | S2 | S2 | S2 | S2 | S2 | S2 | S2 | S2 | S2 | S2 | S2 |
| Heating Temp. (° C.) | 179 | 168 | 170 | 169 | 140 | 140 | 145 | 180 | 161 | 150 | 148 | 169 | 162 | 169 | 137 |
| Heating Time (hrs.) | 1.75 | .51 | .65 | .70 | 7 | 6.5 | 5 | .66 | 1.1 | .7 | 2.5 | 1 | 1.4 | .5 | 1.2 |
| N. V. M. (percent) | 55 | 62.8 | 63.1 | 64 | 65.4 | 64.1 | 63.7 | 64.3 | 61.7 | 65.8 | 62.4 | 63.9 | 63.5 | 63 | 62.4 |
| A. V. on N. V. M | 24 | 58.2 | 33.9 | 28.1 | 13 | 2 | 5 | 13.5 | 39 | 47 | 2.2 | 51.2 | 39 | 25.1 | 49.3 |
| Viscosity e | U-V | W | Y-Z | X | Z₃+ | Z₂ | Z₃+ | Z | V-W | X-Y | X-Y | U-V | W-X | U-V | Y-Z |
| Color i | 6 | 4-5 | 4-5 | 4-5 | 5-6 | 5-6 | 5-6 | 7-8 | 4 | 5-6 | 6-7 | 4-5 | 4-5 | 4 | 6-7 |
| Used to make | E-5 | E-7 | E-8 | E-9 | E-12 | E-13 | E-14 | E-19 | E-20 | E-21 | E-23 | E-24 | E-25 | E-26 | E-29 |

Notes:
a B-7 without reducer added; hence at 90.7% NVM.
b Weight of resin at 100% solids.
c A mixture of 34% xylol, 34% isophorone and 32% cyclohexanone.
d A mixture of 90 g. methylisobutylketone with 29 g. xylol.
e Gardner-Holdt.
f Resin RN34 has an hydroxyl equivalent of 105 and an epoxy equivalent of 225-290.
g Same as Table IV below.
h Resin 1004 has an hydroxyl equivalent of 175 and an epoxy equivalent of 905-985.
i Hellige.

TABLE IV

| Example | Vehicle | | "Epon" Resin, Solution a | Wt. of TiO₂ (g.) | Solvents (grams) | | | | | | Reduction | | |
|---|---|---|---|---|---|---|---|---|---|---|---|---|---|
| | Resin Example | | | | S-1 | S-3 | S-4 | S-5 | S-6 | S-7 | Solvent | Ratio b | Sec. c |
| | No. | Wt.(g.) | | | | | | | | | | | |
| E-1 | B-1 | 283 | 315 | 279 | 89 | 6 | 2 | 22 | | | S5 | 12/1 | 29 |
| E-2 | B-2 | 263 | 315 | 279 | 82 | 22 | 2 | 22 | | | S5 | 11/2 | 26 |
| E-3 | B-3 | 241 | 315 | 279 | 93 | 43 | 2 | 22 | | | S5 | 12/1 | 20 |
| E-4 | B-4 | 418 | 472 | 418 | 134 | 14 | 3.3 | 33.6 | | | S5 | 6/1 | |
| E-5 | D-1 | 569 | none | 279 | 87 | 40 | 2 | 22 | | | S5 | 6/1 | |
| E-6 | B-6 | 402 | 383 | 418 | 117 | 39.6 | 3.3 | 33.6 | | | S5 | 6/1 | |
| E-7 | D-2 | 503 | none | 279 | | 100 | | | 59 | 59 | d S7+S6 | 23/1 | 20 |
| E-8 | D-3 | 502 | none | 279 | | 100 | | | 59.5 | 59.5 | d S7+S6 | 16/1 | 20 |
| E-9 | D-4 | 493 | none | 279 | | 100 | | | 64 | 64 | d S7+S6 | | 20 |
| E-10 | C-1 | 246 | 316 | 279 | 95 | 39 | 2 | 22.4 | | | S5 | 23/1 | 26 |
| E-11 | C-2 | 233 | 316 | 279 | 97 | 50 | 2 | 22.4 | | | S5 | 17/2 | 25 |
| E-12 | D-5 | 366 | none | 200 | | 57 | | | | | d S7+S6 | 5/4 | |
| E-13 | D-6 | 366 | none | 200 | | 57 | | | | | d S7+S6 | 10/7 | |
| E-14 | D-7 | 366 | none | 200 | | 57 | | | | | d S7+S6 | 20/19 | |
| E-15 | | | 406 | 143 | 43 | 14 | | | 66 | | | | |
| E-16 | B-3 | 192 | 1012 | 558 | 30 | 176 | | | 30 | | S5 | 23/1 | 20 |
| E-17 | B-3 | 384 | 760 | 558 | 84 | 120 | 62 | | 30 | | S5 | 23/1 | 20 |
| E-18 | B-3 | 584 | 504 | 558 | 133 | 75 | 126 | | 30 | | S5 | 23/1 | 20 |
| E-19 | D-8 | 491 | none | 279 | | 100 | | | 74.5 | 74.5 | d S7+S6 | 3/1 | 20 |
| E-20 | D-9 | 1,120 | none | 600 | | 126 | | | 182 | | d S7+S6 | 17/6 | 20 |
| E-21 | D-10 | 480 | none | 279 | | 100 | | | 70.5 | 70.5 | d S7+S6 | 5/1 | 20 |
| | | | | | S-1 | S-3 | S-2 | S-5 | S-6 | S-7 | | | |
| E-22 | B-10 | 188 | 226 | 200 | 30 | | | | | | S5 | 64/11 | |
| E-23 | D-11 | 376 | none | 200 | 30 | | | | | | S7+S6+S3 (2/2/1) | | |
| E-24 | D-12 | 528 | none | 279 | | 102 | 100 | | | | S5 | 6/1 | |
| E-25 | D-13 | 500 | none | 279 | | 110 | 110 | | | | S5 | 6/1 | |
| E-26 | D-14 | 502 | none | 279 | | 100 | | | 62 | 62 | d S7+S6 | 11/3 | |
| E-27 | B-15 | 172 | 196 | 186 | | 21 | | | 58 | | | | |
| E-28 | B-3 | 386 | 122 | 271 | 95 | | 95 | | 15 | | S6 | 23/1 | 20 |
| E-29 | D-15 | 376 | | 200 | 30 | | | | | | e S7, S6, S3 | 32/25 | 20 |

Notes:
a Epon 1001; 50% NVM in equal parts of S4 and S1; hydroxyl equivalent 175, epoxy equivalent 450-525.
b Ratio of thinned vehicle to reduction solvent in parts by volume.
c Viscosity in seconds #4 Ford Cup at room temperature.
d Mixture of equal parts of each by volume.
e 10 parts S7, 10 parts S6 and 5 parts S3.

TABLE V

| Example | Physical Properties | | | | | | Humidity Test | | Continuous Alkali Test | | Salt Spray, 400 Hrs. | | Taber Abrasion | |
|---|---|---|---|---|---|---|---|---|---|---|---|---|---|---|
| | Film Thickness b | Inches of Cracking | | Bend Test ⅛" Mandrel | Pencil Hardness | Reflectance | Film Thickness b | 1,000 Hours, No. and Size of pits a | Film Thickness b | Hours to Failure | Film Thickness b | Creepage, Inches | Film Thickness b | Wear Factor |
| | | Impact, 60 in. lbs. | | | | | | | | | | | | |
| | | Concave | Convex | | | | | | | | | | | |
| E-1 | 2.1 | .15 | .38 | .25 | 3H | 94 | 2.6 | 100% sc.9's | 2.6 | 480 | 2.6 | .02 | 2.7 | 48.8 |
| E-2 | 2.0 | .13 | .38 | 0 | 2H | 100 | 2.1 | 2-9's | 2.4 | 654 | 2.4 | .01 | 2.2 | 31.5 |
| E-3 | 2.6 | .16 | .41 | 0 | 2H | 100 | 2.7 | f.sc.9's | 2.6 | 654 | 3.0 | .03 | 2.8 | 34.8 |
| E-4 | | | | | 4H | 15 | | | | | | | | |
| E-5 | | | | | 3H+ | 66 | | | | | | | | |
| E-6 | | | | | 5H | 35 | | | | | | | | |
| E-7 | 2.0 | .14 | .37 | 0 | 3H | 79 | 2.1 | rough | 2.2 | 281 | 1.8 | .02 | | 30.3 |
| E-8 | 1.7 | 0 | .08 | 0 | 3H | 85 | 1.7 | 0 | 1.8 | 413 | 1.6 | .02 | | 34.5 |
| E-9 | 1.5 | .12 | .27 | 0 | 3H | 83 | 1.8 | 0 | 1.8 | 559 | 1.6 | 0 | | 33.2 |
| E-10 | 0.9 | .03 | .03 | 0 | H | 92 | 0.9 | One rust spot | 0.8 | 447 | .78 | .02 | .95 | 35.4 |
| E-11 | 1.0 | .05 | .40 | 4 | H | 75 | 0.9 | 0 | 0.8 | 447 | .83 | .02 | 0.9 | 47.0 |
| E-12 | 0.9 | 0 | .30 | 0 | 3H | 99 | | | .95 | 402 | .85 | .04 | | |
| E-13 | 1.0 | 0 | .40 | 0 | 3H | 97 | | | 1.1 | 279 | 1.0 | .04 | | |
| E-14 | 0.8 | .08 | .42 | 0 | 3H | 97 | | | 0.7 | 163 | 0.7 | .05 | | |
| E-15 | | | | | | | | | | under 69 | | | | |
| E-16 | 2.3 | .14 | .42 | 0 | 3H | 96 | 2.2 | 100% sc.9's | 2.4 | over 996 | 2.0 | .02 | 2.0 | 39.4 |
| E-17 | 2.5 | .14 | .34 | 0 | 3H | 98 | 2.4 | 0 | 2.7 | 829 | 2.2 | 0 | 2.4 | 37.7 |
| E-18 | 2.1 | .12 | .40 | 0 | 3H | 100 | 2.0 | f.sc.9's | 2.6 | 448 | 2.1 | .01 | 2.8 | 39.5 |
| E-19 | 2.0 | .10 | .33 | 0 | 2H | 90 | 2.1 | 0 | 2.2 | 654 | 2.1 | .01 | 2.8 | 40.7 |
| E-20 | 2.1 | .10 | .23 | 0 | 2H | 93 | 2.0 | 0 | 2.2 | 480 | 1.9 | .02 | 3.1 | 39.8 |
| E-21 | 1.3 | .03 | .26 | 0 | 3H | 78 | 1.5 | f.sc.9's | 1.5 | 308 | 1.6 | .01 | 1.8 | 43.7 |
| E-22 | | 0 | 0 | 0 | 7H | 100 | | | | 722 | | | | |
| E-23 | | .12 | .42 | 4 | 3H | 99 | | | | 530 | | | | |
| E-24 | 2.4 | .09 | .20 | | 3H | 87 | 2.0 | seeds | 1.9 | 448 | 1.8 | 0 | 2.3 | 31.9 |
| E-25 | 2.2 | .13 | .12 | | 3H | 83 | 1.8 | seeds | 1.8 | 545 | 2.0 | 0 | 2.6 | 32.4 |
| E-26 | 2.8 | .12 | .38 | | 3H | 87 | 2.5 | 100% sc.9's | 2.3 | 374 | 3.1 | .01 | 2.4 | 37.4 |
| E-27 | 1.5 | .20 | | 0 | 3H | 100 | | | | | | | | |
| E-28 | 2.2 | .08 | .38 | 0 | 3H | 51 | 1.7 | f.9's | 1.9 | 136 | 1.8 | 0 | 2.0 | 45.1 |
| E-29 | | 0 | 0 | 0 | 7H | 92 | | | | 649 | | | | |

Notes:
a "f.9's" means few pits of size 9; "f.sc.9's" means few scattered pits of size 9; "seeds" means pin-point blisters.
b In thousandths of an inch.

*Example E-29*

Seventy-two grams of the cyclohexanone-xylol solution of the siloxy-glyceride phthalic anhydride reaction product of Example B-3 was mixed without heat with 80 g. of a "bisphenol"-epichlorhydrin condensation product containing 50% non-volatiles dissolved in equal volumes of isophorone and xylol. The latter condensation product was a commercially available material known as Epon Resin 1001. This resin possessed an epoxy equivalent weight of 450–525 and an epoxy-plus-hydroxyl equivalent weight of 130; the "n" value was calculated to be approximately 1. Eight grams of cyclohexanone, 50 grams of methyl ethyl ketone, 210 grams of xylol and 625 grams of rutile titanium dioxide were added to the resultant mixed resin solution, and the whole mass was ground on a paint mill for 48 hours.

The foregoing composition was modified to prepare a uniform product having a viscosity and solids content suitable for spraying by stirring into 50 grams of the foregoing composition 27 additional grams of the cyclohexanone-xylol siloxy moiety of Example B-3, together with 30 additional grams of the "Epon" 1001 in solution form described above. The enamel so prepared had the following composition:

| | Percent |
|---|---|
| TiO₂ pigment | 27.90 |
| "Epon" 1001 (solids) | 15.80 |
| Siloxy moiety of Example B-3 (solids) | 15.80 |
| Isophorone | 8.12 |
| Cyclohexanone | 11.38 |
| Methyl ethyl ketone | 2.24 |
| Xylol | 18.70 |
| | 99.94 |

CURING

The coating compositions of this invention may be cured by baking at temperatures as low as 375° F., but we prefer to bake for one hour at 400° C. or about 30 minutes at 425° F. Higher temperatures may also be used with reduction in curing time. The baked coatings show excellent hardness and wear resistance, excellent adhesion to metals, outstanding flexibility, good resistance to grease, good resistance to staining as tested by tincture of iodine and by a dye normally used to color unripened oranges, have a high impact resistance and remarkable resistance to salt spray and to alkalies, the alkali resistance being tested by use of 1% soap solution at 160° F. The coatings accordingly are unusual in combining high hardness with good flexibility, adhesion and impact properties, and are outstanding in combining these properties with all of the other qualities mentioned. The curves given in the figure of drawings illustrate gloss, wear resistance and alkali resistance of a few of the preceding examples, the properties being plotted against the percentage of epoxy moiety in the vehicles thereof.

By suitable selection of the substituted silane(s) employed in preparing the siloxy moiety, good heat resistance properties may be imparted to the baked coating.

By reason of the outstanding properties represented in Table V, our coating compositions are particularly adapted for use in coating such metal articles as stoves, refrigerators, washing machines, ironers, kitchen cabinets, small household appliances, dairy and dairy barn equipment, plumbing fixtures, water-softening equipment and the like. It is also very useful as a can or drum coating. Other uses for the coating compositions will be apparent to those skilled in the art.

Various modifications of the coating compositions can be made, in addition to the modifications indicated previously. For instance, while our compositions have suitable flexibility without the use of a plasticizer, in some instances it may be advantageous to add any of the known reasonably heat-resistant plasticizers which are compatible with the coatings. Modifications in various properties of the coatings may also be secured by blending or heat-bodying therewith compatible urea- and/or melamine-aldehyde resins, compatible alkyds, any of the alkyd-modified siloxanol compositions disclosed and claimed in the copending U. S. application of Ronald L. Millar, Serial No. 113,675, filed September 1, 1949, now U. S. Patent No. 2,663,964, and other compatible film-forming materials.

When preparing laminants, impregnants, adhesives and molding powders, modifications of the type mentioned last above may also be effected. In further respect to molding powders, the use of basic pigments can also be advantageous in bringing about rapid curing at room or slightly elevated temperatures. Fillers, of course, may be included in the molding powders.

Having described our invention, what we claim is:

1. A heat-convertible, solvent-thinned resinous composition of matter particularly adapted for use in preparing coating compositions which can be cured by baking at elevated temperatures to give durable, protective films, said resinous composition comprising the following essential film-forming materials and compatible organic solvents therefor: (1) a resinous epoxy moiety which is a polyether derivative of polyhydric phenols, said derivative having alternating aromatic and aliphatic nuclei united through ether oxygen, having terminal epoxy groups and being free of functional groups other than epoxy and hydroxyl groups, said epoxy moiety constituting from a small effective amount up to about 90% by weight of the total resin solids, and (2) a resinous siloxy moiety comprising a condensate hereinafter designated an "A" component at least partially combined chemically with dicarboxylic material selected from the class consisting of dicarboxylic acids, their anhydrides and mixtures thereof, to form a product which is capable of being combined in compatible solvents with said epoxy moiety without producing any substantial quantity of phase separation, said "A" component being a condensate having the following general formula $$\left[ \frac{R_a(R'O)_b SiO_{4-(a+b)}}{2} \right]_x \left[ R''O_{v/2}(OH)_w \right]_y$$

wherein R represents at least one monovalent radical selected from the group consisting of the phenyl radical and any alkyl radical having 1 through 6 carbon atoms; wherein R' represents at least one hydrocarbon radical of one to twenty carbons united to oxygen through a carbon atom of said radical which has attached thereto at least one hydrogen atom; wherein R'' represents a polyvalent hydrocarbon radical; wherein $a$, $b$, $v$ and $w$ have the following average values:

$a=1$ to $2$     $v=1$ to $3$
$b=0$ to $0.5$     $w$ is a number up $3$ wherein the sum of $v$ plus $w$ exclusive of oxygens and hydroxyls attached to tertiary carbon atoms and aromatic nuclei is from 2 to 5, inclusive; wherein said values $a$, $b$ and $w$ are further related by the expression $K=[4-(a+b)]w$ so as to give K a value between 1 and 4, inclusive; and wherein the ratio of $x$ to $y$ is from 1 to 2 up to 4 to 1, inclusive.

2. A composition as claimed in claim 1 wherein R of the general formula of said "A" component represents the phenyl radical.

3. A composition as claimed in claim 1 wherein R of the general formula of said "A" component represents the methyl radical.

4. A composition as claimed in claim 1 wherein R of the general formula of said "A" component represents a mixture composed of the phenyl and methyl radicals.

5. A composition as claimed in claim 4 wherein said epoxy moiety constitutes between about 10% and 80% of the total solids contributed thereto by said epoxy and siloxy moieties.

6. A composition as claimed in claim 1 wherein said epoxy moiety constitutes between about 10% and 80% of the total solids contributed thereto by said epoxy and siloxy moieties.

7. A composition as claimed in claim 1 wherein the amount of dicarboxylic material is such as to form a product which is ungelled but which is capable of gelling when heated for a prolonged period of time.

8. A composition as claimed in claim 1 wherein the K value of said "A" component is between 2 and 4.

9. A composition as claimed in claim 1 wherein said epoxy moiety consists of the resinous reaction products of epichlorhydrin and 4-4'-dihydroxy-diphenyl-2,2-propane, wherein said resinous reaction products have an "n" value between 0 and 3 and wherein "n" is the subscript shown in the general formula

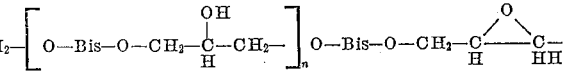

in which formula "Bis" represents the divalent radical 4-4'-diphenyl-2,2-propane.

10. A composition as claimed in claim 9 wherein the K value of said "A" component is between 2 and 4, and wherein R'' of the general formula of said "A" component is the trivalent hydrocarbon residue of glycerine.

11. A composition as claimed in claim 1 wherein said siloxy moiety includes, along with said "A" component, polyhydric alcohol-dicarboxylic acid alkyd resin.

12. The method of effecting the cure of a resinous, complex epoxy moiety which is a polyether derivative of polyhydric phenols, said derivative having alternating aromatic and aliphatic nuclei united through ether oxygen, having terminal epoxy groups and being free of functional groups other than epoxy and hydroxyl groups, said method comprising: providing a resinous siloxy moiety comprising a condensate hereinafter designated an "A" component at least partially combined chemically with dicarboxylic material selected from the class consisting of dicarboxylic acids, their anhydrides and mixtures thereof, to form a product which is capable of being combined in compatible solvents with said epoxy moiety without producing any substantial quantity of phase separation, said "A" component being a condensate having the following general formula:

$$\left[ \frac{R_a(R'O)_b SiO_{4-(a+b)}}{2} \right]_x \left[ R''O_{v/2}(OH)_w \right]_y$$

wherein R represents at least one radical selected from the group consisting of the phenyl radical and any alkyl radical having from 1 through 6 carbons; wherein R' represents at least one hydrocarbon radical of one to twenty carbons, inclusive united to oxygen through a carbon atom of said radical which has attached thereto at least one hydrogen atom; wherein R'' represents a polyvalent hydrocarbon radical; wherein $a$, $b$, $v$ and $w$ have the following average values:

$a=1$ to $2$     $v=1$ to $3$
$b=0$ to $0.5$     $w$ is a number up to $3$ wherein the sum of $v$ plus $w$, exclusive of oxygens and hydroxyls attached to tertiary carbon atoms and aromatic nuclei, is from 2 to 5, inclusive; wherein said values $a$, $b$ and $w$ are further related by the expression $$K=[4-(a+b)]w$$

so as to give K a value between 1 and 4, inclusive; and wherein the ratio of $x$ to $y$ is from 1 to 2 up to 4 to 1, inclusive; blending said siloxy moiety with said complex epoxy moiety with the aid of compatible organic solvents to prepare a composition in which the said epoxy moiety constitutes from a small effective amount up to about 90% of the total solids in said moieties, and thereafter heating said composition at temperatures between about 375° F. and the decomposition temperature of said composition.

13. A heat-convertible resinous composition of matter comprising a substantially homogeneous mixture of: (1) a resinous complex epoxy moiety which is a polyether derivative of polyhydric phenols, said derivative having alternating aromatic and aliphatic nuclei united through ether oxygen, having terminal epoxy groups and being free of functional groups other than epoxy and hydroxyl groups, said epoxy moiety constituting from a small effective amount up to about 90% by weight of the total resin solids in said mixture, and (2) a resinous siloxy moiety comprising a condensate hereinafter designated an "A" component at least partially combined chemically with dicarboxylic material selected from the class consisting of dicarboxylic acids, their anhydrides and mixtures thereof, to form a product which is capable of being combined in compatible solvents with said epoxy moiety without producing any substantial quantity of phase separation, said "A" component being a condensate having the following general formula

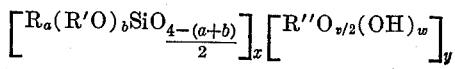

wherein R represents at least one radical selected from the group consisting of the phenyl radical and any alkyl radical having from 1 through 6 carbons; wherein R' represents at least one hydrocarbon radical of one to twenty carbons, inclusive united to oxygen through a carbon atom of said radical which has attached thereto at least one hydrogen atom; wherein R" represents a polyvalent hydrocarbon radical; wherein $a$, $b$, $v$ and $w$ have the following average values:

$a=1$ to 2     $v=1$ to 3
$b=0$ to 0.5   $w$ is a number up to 3 wherein the sum of $v$ plus $w$, exclusive of oxygens and hydroxyls attached to tertiary carbon atoms and aromatic nuclei, is from 2 to 5, inclusive; wherein said values $a$, $b$ and $w$ are further related by the expression $K=[4-(a+b)]w$ so as to give K a value between 1 and 4, inclusive; and wherein the ratio of $x$ to $y$ is from 1 to 2 up to 4 to 1, inclusive.

14. A composition as claimed in claim 13 wherein said epoxy moiety constitutes between about 10% and 90% by weight of the total resin solids contributed by said epoxy and siloxy moieties; wherein said epoxy moiety consists of the reaction products of epichlorhydrin and 4-4'-dihydroxy-diphenyl-2,2-propane; wherein the "n" value of said epoxy moiety is between 0 and 3 and wherein "n" is the subscript shown in the general formula

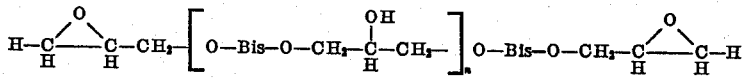

in which formula "Bis" represents the divalent radical 4-4'-diphenyl-2,2-propane.

15. A composition as claimed in claim 14 wherein R of the general formula of said "A" component represents a mixture of phenyl and methyl radicals; wherein R" represents the trivalent hydrocarbon radical of glycerine, and wherein the K value of the siloxy moiety is between 2 and 4.

16. A composition as claimed in claim 14 wherein R of the general formula of said "A" component represents the phenyl radical; wherein R" represents the trivalent hydrocarbon radical of glycerine, and wherein the K value of the siloxy moiety is between 2 and 4.

17. A composition as claimed in claim 13 wherein R of the general formula of said "A" component represents the phenyl radical; wherein R" represents the trivalent hydrocarbon radical of glycerine, and wherein the K value of the siloxy moiety is between 2 and 4.

18. A heat-convertible resinous composition of matter comprising a substantially homogeneous mixture of: (1) a complex resinous epoxy moiety which is a polyether derivative of polyhydric phenols, said derivative having alternating aromatic and aliphatic nuclei united through ether oxygen, having terminal epoxy groups and being free of functional groups other than epoxy and hydroxyl groups, said epoxy moiety constituting from a small effective amount up to about 90% by weight of the total resin solids, and (2) a resinous siloxy moiety comprising a condensate having the following general formula

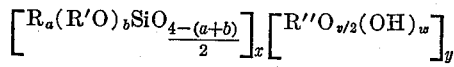

wherein R represents at least one radical selected from the group consisting of the phenyl radical and any alkyl radical having from 1 through 6 carbons; wherein R' represents at least one hydrocarbon radical of one to twenty carbons inclusive, united to oxygen through a carbon atom of said radical which has attached thereto at least one hydrogen atom; wherein R" represents a polyvalent hydrocarbon radical; wherein $a$, $b$, $v$ and $w$ have the following average values:

$a=1$ to 2     $v=1$ to 3
$b=0$ to 0.5   $w$ is a number up to 3 wherein the sum of $v$ plus $w$, exclusive of oxygens and hydroxyls attached to tertiary carbons and aromatic nuclei, is from 2 to 5, inclusive; wherein said values $a$, $b$ and $w$ are further related by the expression $$K=[4-(a+b)]w$$

so as to give K a value between 1 and 4, inclusive; and wherein the ratio of $x$ to $y$ is from 1 to 2 up to 4 to 1, inclusive.

References Cited in the file of this patent
UNITED STATES PATENTS

| 2,584,343 | Goodwin et al. | Feb. 5, 1952 |
| 2,584,351 | Hunter et al. | Feb. 5, 1952 |
| 2,687,398 | McLean | Aug. 24, 1954 |
| 2,695,276 | Hatcher | Nov. 23, 1954 |

OTHER REFERENCES

Glaser Official Digest, No. 305, June, 1950, pages 418 and 437-443.